United States Patent
Bernstein et al.

(10) Patent No.: US 7,168,111 B2
(45) Date of Patent: Jan. 30, 2007

(54) JACKNIFE BED AND COUCH FOR MOBILE VEHICLE

(75) Inventors: William M. Bernstein, Pittsburgh, PA (US); Derek Blitz, Portland, OR (US); Andrew Kilb, Carrboro, NC (US); Megan M. Stanton, Long Beach, CA (US); David M. Wynne, Fishkill, NY (US); Deepshikha B. Antes, Columbia, MD (US); Edwin K. Chan, Wilmington, DE (US); Benjamin G. Morris, Falls Church, VA (US); Scott Raven, Atlanta, GA (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/339,165

(22) Filed: Jan. 25, 2006

(65) Prior Publication Data

US 2006/0168723 A1    Aug. 3, 2006

Related U.S. Application Data

(60) Provisional application No. 60/646,817, filed on Jan. 25, 2005.

(51) Int. Cl.
*A47C 17/17*    (2006.01)
(52) U.S. Cl. ........................ 5/118; 5/488; 5/37.1; 5/41; 5/48
(58) Field of Classification Search ............... 5/37.1, 5/38, 41, 42.1, 47, 48, 59.1, 118, 488, 692
See application file for complete search history.

(56) References Cited

U.S. PATENT DOCUMENTS

| | | | | | |
|---|---|---|---|---|---|
| 2,638,608 | A | * | 5/1953 | Garrigus, Sr. | 5/692 |
| 2,865,030 | A | * | 12/1958 | Carrick | 5/51.1 |
| 3,634,893 | A | * | 1/1972 | Hern et al. | 5/37.1 |
| 4,190,911 | A | * | 3/1980 | Wadsworth | 5/44.1 |
| 4,217,669 | A | * | 8/1980 | Fefferman | 5/47 |
| 4,487,451 | A | * | 12/1984 | Fiorini | 297/219.1 |
| 4,939,802 | A | * | 7/1990 | Lafer | 5/42.1 |
| 6,986,175 | B2 | * | 1/2006 | Maas | 5/37.1 |

* cited by examiner

*Primary Examiner*—Michael Trettel
(74) *Attorney, Agent, or Firm*—Jeffrey P. Calfa; Gerald W. Askew; Susan L. Lukasik

(57) ABSTRACT

A combination jackknife bed and couch for a mobile vehicle. The jackknife bed and couch allows drivers to wake up and fold their sheets and pillow away from a seamless sleeping surface without the need to remove the sheets, blankets, pillows or other bedding materials. The sheets stay made within the folded up bed now turned into the couch. The couch may be unfolded with the sheets fully made so the driver may catch some well deserved post socializing rest without having to re-install the sheets. These features are made possible by folding the bed in and half and keeping it in the backrest of the couch. The sheets are held in place by stretchable retaining surface that may be extended over the bedding materials. When returned to the bed mode, the stretchable retaining surface must be released and potential energy in the winder may be used to retract the retaining surface.

6 Claims, 4 Drawing Sheets

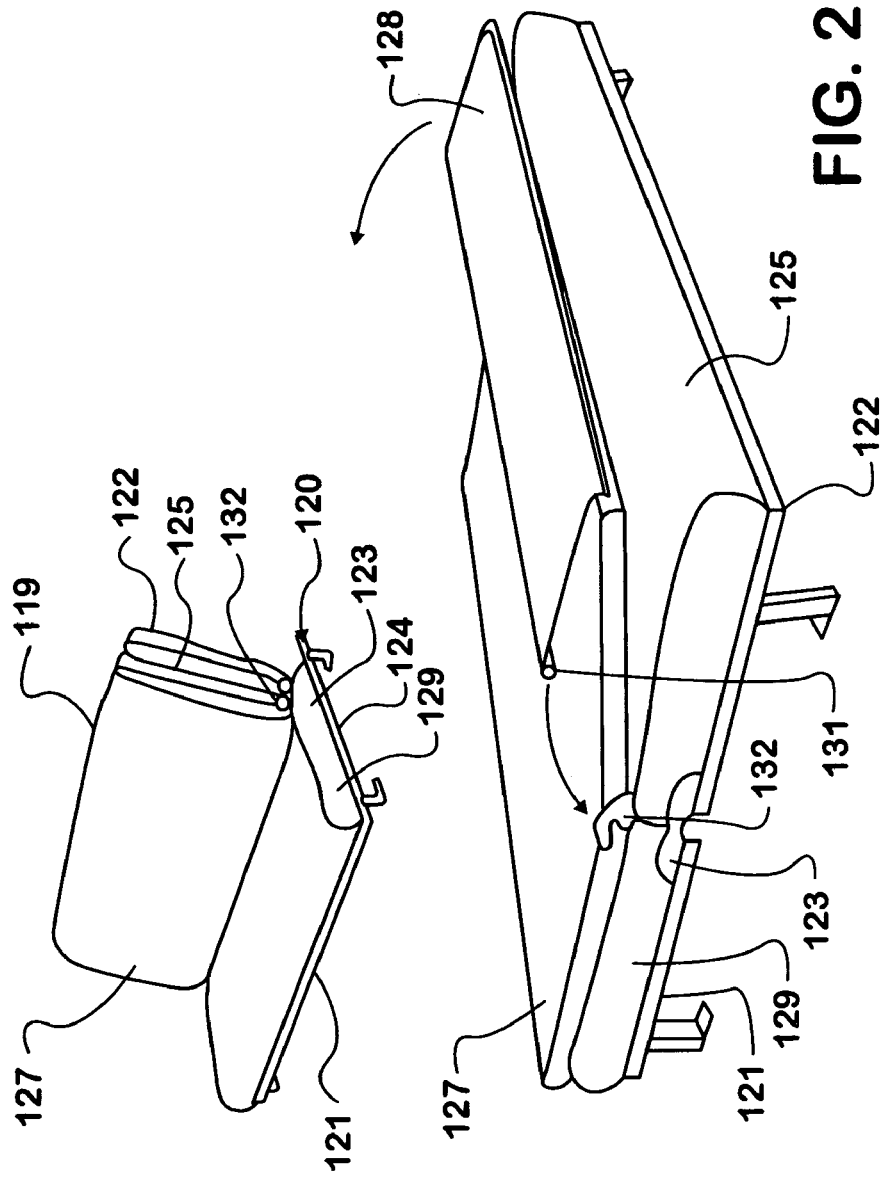

FIG. 3
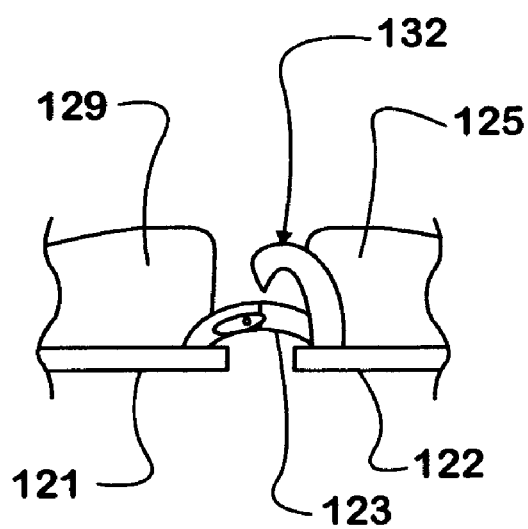
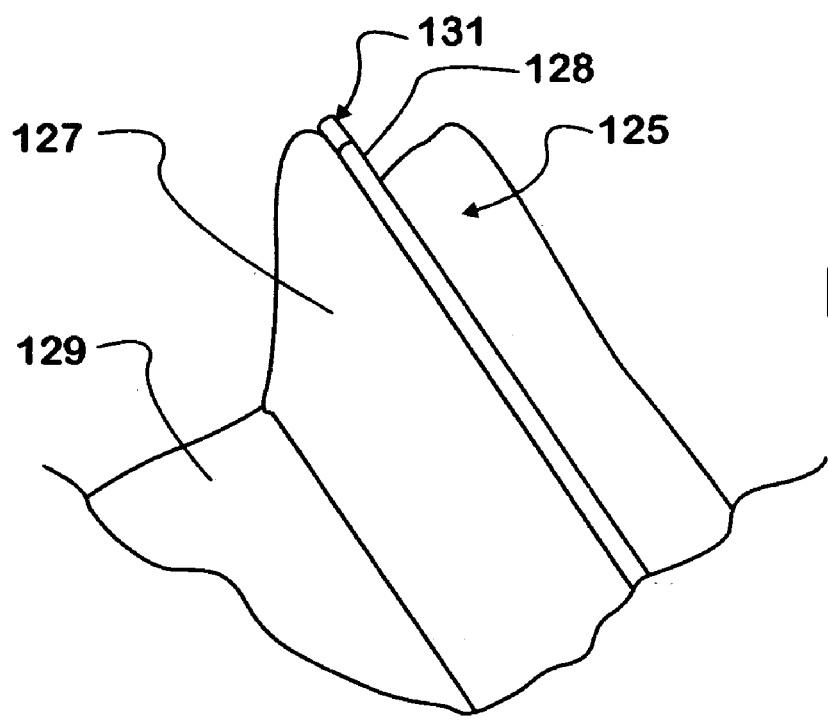
FIG. 5

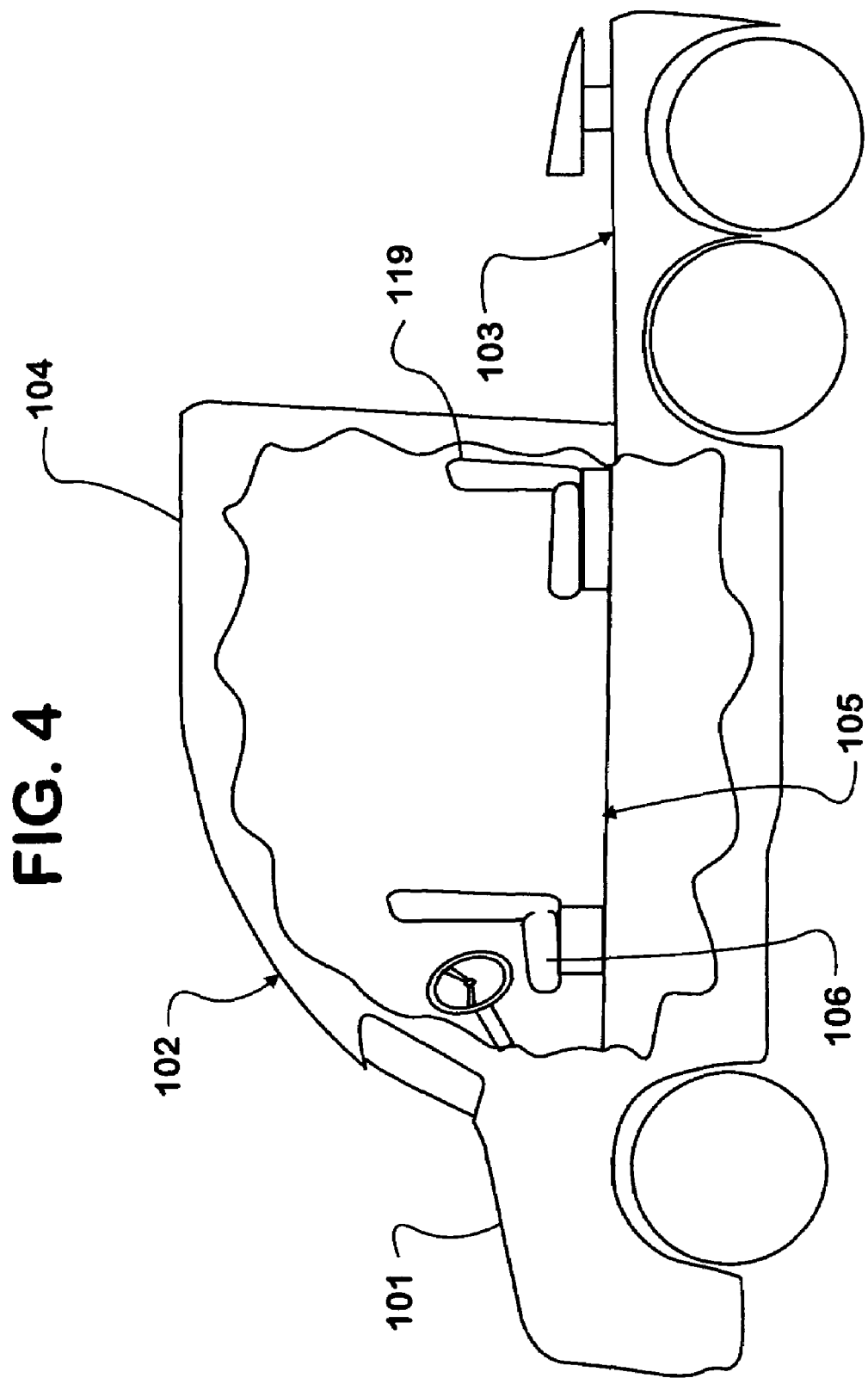

JACKKNIFE BED AND COUCH FOR MOBILE VEHICLE

This patent issues from a non-provisional patent application claiming the priority of provisional patent applications Ser. No. 60/646,817, filed Jan. 25, 2005.

BACKGROUND

Trucks carry a bulk of the goods within the United States. Driver's have a difficult lifestyle in which they spend much of their time within the cab and sleeper of their over the road tractor trailers. They must comply with federal regulations in the United States that limit the amount of time behind the wheel as well as boredom and discomfort living life within the walls of what has been likened to a small mobile studio apartment. For employers that employ over the road drivers, retention has become a challenge. The general method of moving goods with trucks is not likely to change in the foreseeable future. The results of a survey performed by the inventors of this patent show that during their off-hours, truckers spend an average of 3.6 hours in truck awake. Of these hours, they spend about one hour preparing food, nearly an hour socializing with friends inside their trucks, and about 2.5 hours entertaining themselves with television or books. This invention and the project that it sprang from is intended to:

Create a space that drivers will be proud to show to other drivers,

Allow for 3–5 truckers to socialize together in the truck comfortably,

Create a space for food preparation and storage specific to the eating habits of truckers, Create a bright and entertaining environment, Give drivers a sense of separation between work and leisure, Give drivers a way to isolate their sleeping space from their living space, and Optimize the limited amount of space in a sleeper for storage.

Research pointed heavily towards providing truck drivers with a place to lounge comfortably, and utilizing the lower bunk space for the dual purpose of seating and sleeping is the most efficient way to achieve this. It was very important that the transition from seating to sleeping and back be as quick and effortless as possible. Any amount of extra effort on the driver's would most likely lead to underutilization of the feature. This criterion led us to the combination jackknife bed and couch for a mobile vehicle of this invention. The invention focuses on providing mobile vehicle furniture that may be a comfortable couch when the driver is socializing. The combination bed and couch is converted into the socializing truck furnishing from a bed fully made up with sheets, blankets, and pillow without the sheets and bedding material being removed.

Jackknife beds have been used in the Recreation Vehicle (RV) industry in the past because of their ease of use. The unit is transformed from bed to sofa and back in seconds. One only needs to lift under the seat and pull out, and the sofa drops into a bed. Returning it to a sofa is just as easy. Though its use is simple, it has had two major flaws:

When pulled out the bed has a gap running down the middle of the sleeping surface.

The bedding has to be made and put away every time it is transitioned from sofa to bed or bed to sofa.

These flaws led to innovation that differentiates the combination jackknife bed and couch solution of this invention from other solutions currently on the market through two defining features:

Keeps sheets made

Seamless sleeping surface

These features are made possible by folding the bed in half and keeping it in the backrest.

SUMMARY

This invention relates to a combination jackknife bed and couch for a mobile vehicle. The jackknife bed and couch allows drivers to wake up and fold their sheets and pillow away from a seamless sleeping surface without the need to remove the sheets, blankets, pillows or other bedding materials. The sheets stay made within the folded up bed now turned into the couch. The couch may be unfolded with the sheets fully made so the driver may catch some well deserved post socializing rest without having to re-install the sheets. These features are made possible by folding the bed in and half and keeping it in the backrest of the couch. The sheets are held in place by stretchable retaining surface that may be extended over the bedding materials. When returned to the bed mode, the stretchable retaining surface must be released and potential energy in the winder may be used to retract the retaining surface. When the unit is put into bed mode, this unit requires two more simple steps than a typical prior art jackknife bed, but eliminates the need to remake the bedding and removes the uncomfortable gap in the middle of bed.

DRAWINGS

Other objects and advantages of the invention will become more apparent upon perusal of the detailed description thereof and upon inspection of the drawings, in which:

FIG. 1 is a front perspective view of a combination jackknife bed and couch for a mobile vehicle in the couch mode made in accordance with this invention.

FIG. 2 is a perspective view of the combination jackknife bed and couch for a mobile vehicle shown in FIG. 1 in the bed mode.

FIG. 3 is a side view of the combination jackknife bed and couch for a mobile vehicle of FIG. 2.

FIG. 4 is a partial cutaway view of a mobile vehicle with the combination jackknife bed and couch for a mobile vehicle of FIG. 2 installed.

FIG. 5 is a top perspective view of the combination jackknife bed and couch for a mobile vehicle of FIG. 2.

DESCRIPTION OF INVENTION

Figure 6:
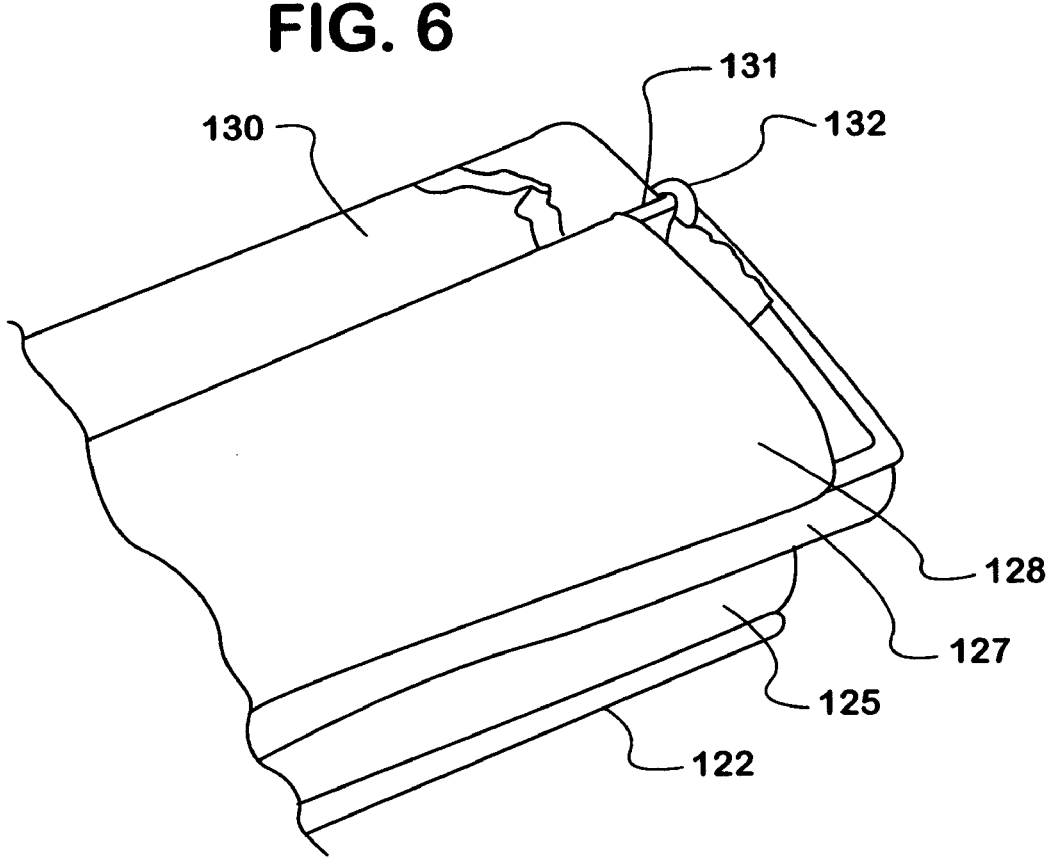
FIG. 6 is a top perspective of the combination jackknife bed and couch for a mobile vehicle of FIG. 2 in the bed mode with the bedding materials held in place for fold up to couch mode.

A motor vehicle 101, specifically a tractor trailer, includes a cab 103 engaged to a drive train bearing chassis 102. The cab 103 has a driver's seat 106. For over the road tractors, there will be a sleeper compartment 104 that includes driver living space. The sleeper compartment 104 includes a mounting floor 105 as well as the off duty living space for the driver or drivers. The vehicle 101 shown in FIG. 4 has a combination jackknife bed and couch 119 made in accordance with the invention resting on the mounting floor 119 and mounted within the sleeper compartment 104.

The combination jackknife bed and couch 119 shown in FIGS. 1 and 2 includes a support base 120. There is a sofa backrest 122 and seat 121. The sofa backrest 122 and seat 121 are hinged together through a hinge 123 so that the backrest 122 and seat 121 may moved in a jackknife fashion relative to each other to form a couch or sofa depending on the desired mode. The seat 121 slides along the support base 120. The seat 121 contains a seat cushion 129 as well as a rigid seat frame 124. The backrest 122 contains a seat cushion 125 as well as a rigid backrest frame 126. There is a mattress 127 that has a surface area roughly equal to the sum of the upper surfaces of the backrest 122 and seat 121 when the jackknife bed and couch 119 is in the bed mode. The mattress 127 covers both the backrest 122 and seat 121 so as to provide a driver with a seamless sleeping surface.

Figure 7:
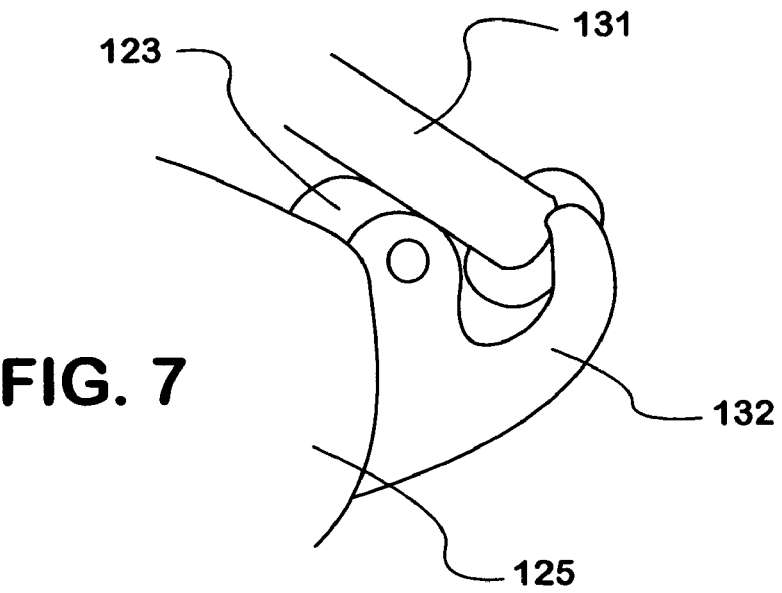
FIG. 7 is a close-up view of hinging mechanism for engagement to the stretchable retaining surface of the combination jackknife bed and couch for a mobile vehicle of FIG. 2.

In order to preserve the bedding in the made position on the combination jackknife bed and couch 119 including a pillow and bedding 130, there is an elastomeric cover 128 rolled up like a window shade, but constantly in tension, that covers one half of the mattress 127 sleeping surface. The elastomeric cover 128 is mounted at the front of the bed (top of the backrest 122). The elastomeric cover 128 is pulled out via a rigid pole 131 running the width of the combination bed and couch 119 that is attached to the exposed end of the elastomeric fabric cover 128. This rigid pole 131 hooks into a hinging mechanism 132 at the midpoint of the combination bed and couch 119 covering the front half with the fabric cover 128 and pinching the sheets and bedding 130 against the foam bed cushion 125 creating a hinge point. The hinging mechanism 132 may be in the shape of a hook allowing one end of the rigid pole to be "hooked" with the elastomeric cover 128 being under tension. There may be one hinging mechanism on each side of the combination bed and couch 119 so as to engage both ends of the rigid pole 131. This embodiment provides enhanced stability to the engagement of the bedding material by the elastomeric cover 128 against the inner surface of the mattress 127. The elastomeric roll 128, mounted at the front of the combination bed and couch 119 provides tension keeping the bedding 130 in place while it is folded back into sofa mode. The use of an elastomeric fabric allows the cover 128 to conform to the contours of various bedding items 130 left on the bed such as pillows or clothing. See FIGS. 5, 6, and 7.

The combination jackknife bed and couch 119 may be transformed from bed to couch or sofa and back in seconds. One only needs to lift under the seat and pull out, and the sofa drops into a bed, essentially de-jackknifing the combination of the backrest 122 and seat 121. Returning the combination bed and couch 119 to a sofa is just as easy. The combination bed and couch 119 has two distinct advantages over the prior art:
Keeps sheets made
Seamless sleeping surface These features are made possible by first using the elastomeric cover 128 to hold the bedding in the last position used by engaging the rigid pole 131 into the hinging mechanism 132, and then folding the mattress 127 in half and keeping it against the backrest 122. When the unit is put into bed mode, this unit requires two more simple steps than a typical jackknife bed, but eliminates both the need to remake the bedding and the uncomfortable gap in the middle of the bed.

Once the unit is flat, (typical Jackknife bed position) the backrest 122 sits higher than the seat. The mattress 127 then folds over (hinged at the bottom of the backrest and middle of the bed) exposing the bedding 130. In the bed position, the sofa backrest 122 and seat 121 are touching and become padding for the front half of the bed. The mattress 127 is one piece of foam that spans the entire unit bridging the gap in the middle.

As described above, the combination jackknife bed and couch of this invention and vehicle made with the bed and couch provide a number of advantages, some of which have been described above and others of which are inherent in the invention. Also modifications may be proposed to the combination jackknife bed and couch and vehicle made with the bed and couch of this invention without departing from the teachings herein.

We claim:

1. A combination jackknife bed and couch for a mobile motor vehicle, the vehicle having a sleeper compartment with a mounting floor, comprising:
   a support base;
   a sofa backrest and seat engaged to said support base;
   said sofa backrest and said seat being hinged together through a hinge allowing said backrest and seat to be moved in a jackknife fashion relative to each other to enter either a couch or bed mode depending on a desired mode;
   said seat slideable along said support base;
   said seat containing a seat cushion as well as a rigid seat frame;
   said backrest containing a seat cushion as well as a rigid backrest frame;
   a mattress having a surface area roughly equal to the sum of the upper faces of said backrest and said seat when said jackknife bed and couch is in a bed mode;
   said mattress covering both said backrest and said seat providing the user with a seamless sleeping surface;
   an elastomeric cover rolled up under tension and mounted at a top of said backrest;
   said elastomeric roll for covering a portion of said mattress sleeping surface and holding bedding materials in place against said mattress, allowing said mattress to be folded against said backrest;
   said elastomeric cover unrollable via a rigid pole running a width of said combination bed and couch and said rigid pole being is attached to an exposed end of the fabric of said elastomeric roll;
   said rigid pole hookable into a first hinging mechanism at the midpoint of said support base allowing said elastomeric cover to apply tension to against a seat cushion of said back rest and further allowing any bedding to be held in place when said backrest and said seat are jackknifed into a couch mode.

2. The combination jackknife bed and couch of claim 1, wherein:
   said first hinging mechanism is in a shape of a hook allowing one end of said rigid pole to be hooked with said elastomeric cover being under tension.

3. The combination jackknife bed and couch of claim 2, wherein:
   a second hinging mechanism on an opposite side of said first hinging mechanism so as to allow engagement of both ends of said rigid pole.

4. A mobile vehicle in combination with a combination jackknife bed and couch, comprising:
   a cab engaged to a drive train bearing chassis;
   a sleeper compartment including driver living space;

said sleeper compartment including a mounting floor;
a combination bed and couch support base engaged to said mounting floor;
a sofa backrest and seat engaged to said support base;
said sofa backrest and said seat being hinged together through a hinge allowing said backrest and seat to be moved in a jackknife fashion relative to each other to enter either a couch or bed mode depending on a desired mode;
said seat slideable along said support base;
said seat containing a seat cushion as well as a rigid seat frame;
said backrest containing a seat cushion as well as a rigid backrest frame;
a mattress having a surface area roughly equal to the sum of the upper faces of said backrest and said seat when said jackknife bed and couch is in a bed mode;
said mattress covering both said backrest and said seat providing the user with a seamless sleeping surface;
an elastomeric cover rolled up under tension and mounted at a top of said backrest;
said elastomeric roll for covering a portion of said mattress sleeping surface and holding bedding materials in place against said mattress, allowing said mattress to be folded against said backrest;
said elastomeric cover unrollable via a rigid pole running a width of said combination bed and couch and said rigid pole being is attached to an exposed end of the fabric of said elastomeric roll;
said rigid pole hookable into a first hinging mechanism at the midpoint of said support base allowing said elastomeric cover to apply tension to against a seat cushion of said back rest and further allowing any bedding to be held in place when said backrest and said seat are jackknifed into a couch mode.

5. The mobile vehicle combination of claim 4, wherein:
said first hinging mechanism is in a shape of a hook allowing one end of said rigid pole to be hooked with said elastomeric cover being under tension.

6. The mobile vehicle combination of claim 5, wherein:
a second hinging mechanism on an opposite side of said first hinging mechanism so as to allow engagement of both ends of said rigid pole.

* * * * *